United States Patent Office 3,454,256
Patented July 8, 1969

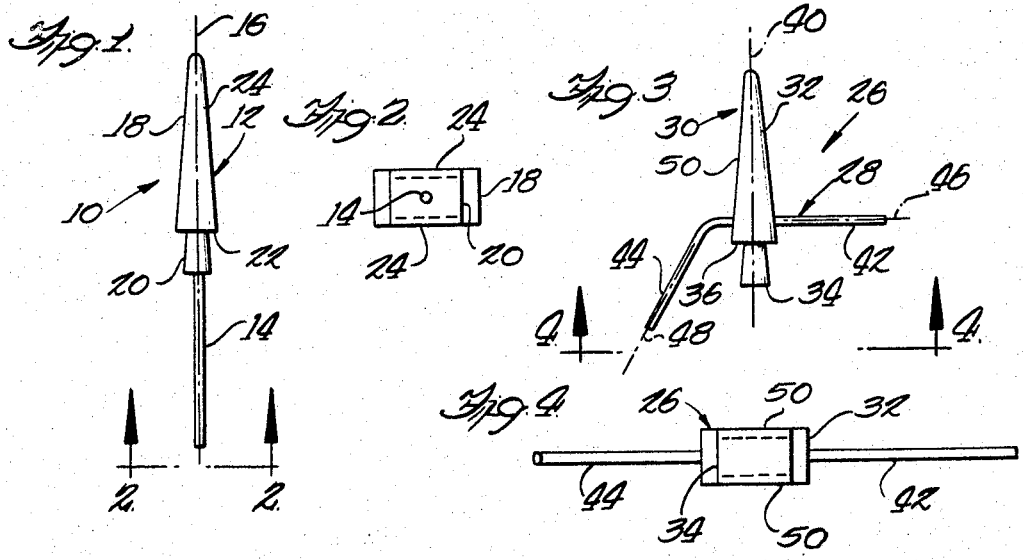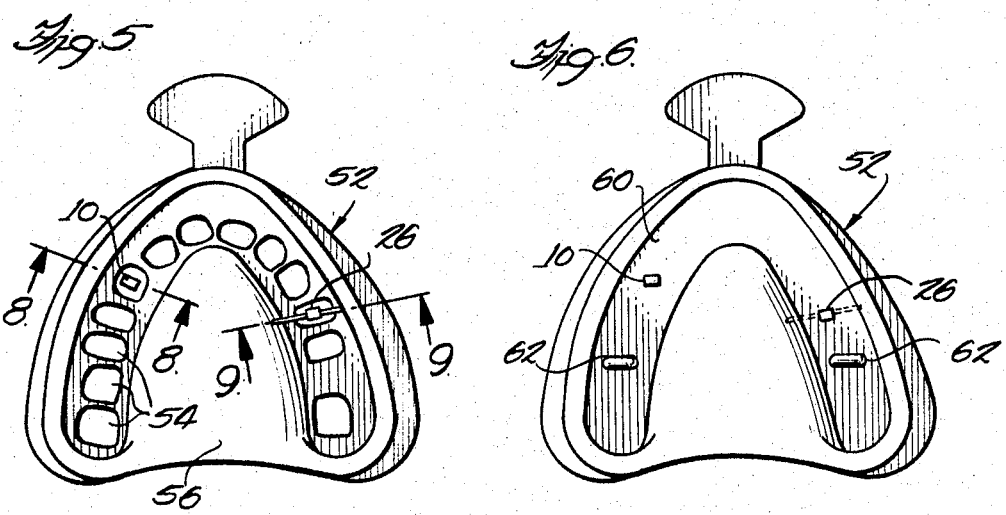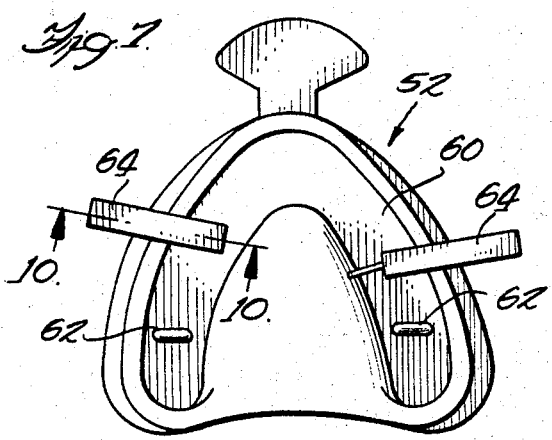

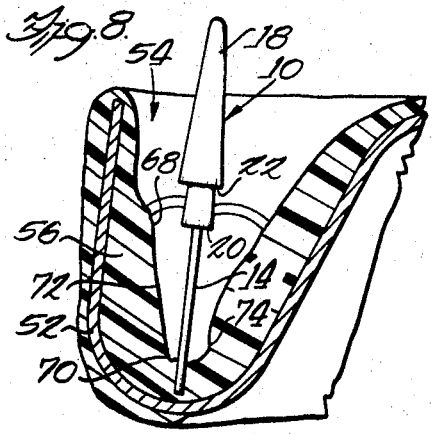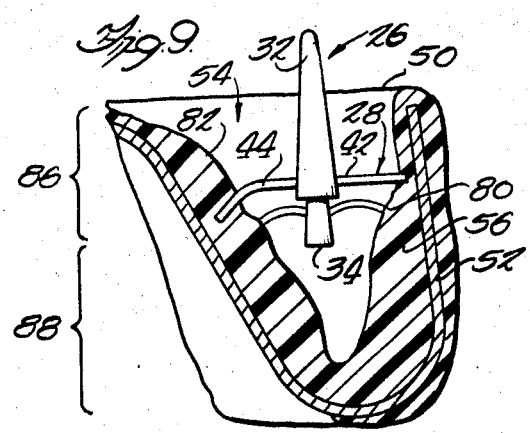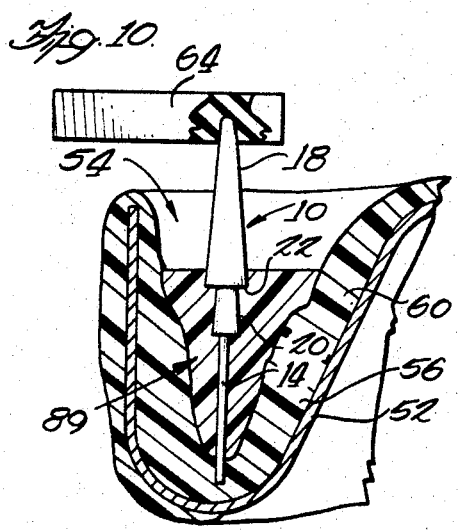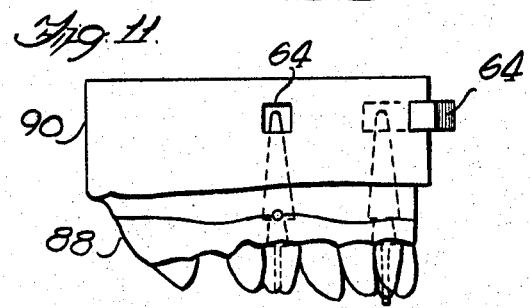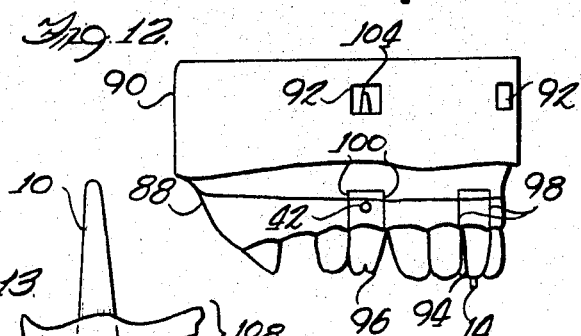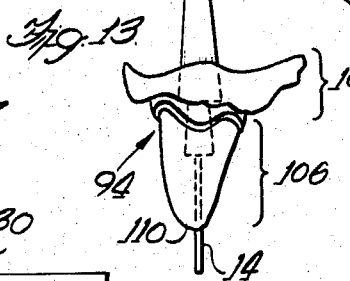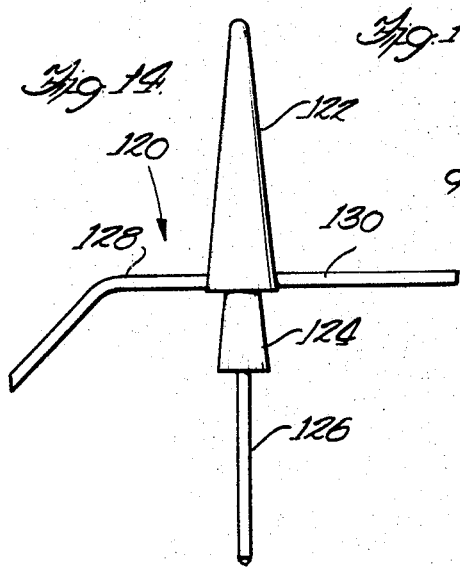

3,454,256
DOWEL ASSEMBLY
Alfred J. Stern, 5307 Valkeith St. 77035, and Harold L. Stern, 6906 Van Etten St. 77021, both of Houston, Tex.
Filed Sept. 15, 1966, Ser. No. 579,748
Int. Cl. A61c 9/00
U.S. Cl. 249—54                                    7 Claims

ABSTRACT OF THE DISCLOSURE

A dental apparatus for use in making a positive replica of a tooth from a negative impression of the tooth formed in impression material. The apparatus comprises an elongated dowel having a tapered body portion having at least one flat surface, and a shank portion extending from the wide end of the body portion. A pin is secured to the dowel adjacent the wide end of the body portion and provides a first pin end portion extending generally transversely from the dowel and a second pin end portion extending at an acute angle with respect to the longitudinal axis of the dowel.

---

This invention relates to a method and apparatus for preparing models of teeth for use in making bridges and abutments for partials or any other purpose for which a removable or reinforced abutment is desirable.

It is a common practice, when making a model of a patient's teeth, to first form a negative impression of the teeth. Dowel or mounting pins are positioned in the center of impressions of particular teeth which are to be worked on. The negative impressions of the teeth are then filled with a die material to form a positive replica or die of the teeth. After the die material has cured or set, the model is completed by casting a base stone formed integrally with the die material to form a foundation for the replica of the teeth. A tooth which is to be worked on is separated from the model by cutting the die material with a saw or other means and lifting the tooth die, on its dowel or mounting pin, from the base stone. The dowel or mounting pin facilitates handling the tooth die and the repositioning of the tooth die back on the base stone.

The satisfactory results obtained by the above method for fabricating models of teeth is shown by the widespread usage of the method by dentists and dental technicians. A major difficulty encountered in practicing the method lies in positioning the dowel or mounting pin in the center of the negative impression of the teeth which are to be worked on. If a longitudinal axis of the dowel is located at a substantial angle relative to a vertical axis of the tooth impression, the model may be ruined when the tooth die is separated from the base stone. If the dowel extends into an adjacent tooth, the removal of a selected tooth die is extremely difficult, if not impossible. Also, if the dowel is positioned in an abutting relationship with side walls of the tooth impression, the die of the tooth is ruined by the projecting surface of the dowel. Therefore, it is essential that the dowel be maintained in a substantially vertical position in the center of the impression of the tooth, and if desired parallel to each other.

The most common prior art method of positioning a dowel in a tooth impression consists of manually inserting and holding the dowel in the impression of a tooth. In practicing this method of positioning a dowel, the negative impression of the tooth is first filled with a die material. The dowel is then inserted into the die material in the negative impression of a tooth and held while the die material sets or crystallizes. This method of positioning a dowel requires that the dowel be positioned by a skilled dental technician relative to the negative impression of a tooth after the impression has been filled with die material. Since the die material blocks the dental technician's vision of side surfaces of the negative impression of a tooth, it is almost impossible to accurately position a dowel relative to the negative impression of a tooth with the prior art method. In addition to requiring the blind placement of the dowel relative to the negative impression of a tooth, the manual inserting and holding of the dowel is extremely time consuming.

Another prior art solution to the problem of positioning a dowel in a tooth impression consists of using a jig to hold the dowel. The jig is usually attached to a dental impression trough or a separate stand and includes a plate member which overlies the negative tooth impression. A rod, to which the dowel is attached, is then suspended from the plate to center the dowel in the tooth impression. The vertical and lateral adjustment of a jig to position a dowel in a tooth impression is both difficult and time-consuming. The difficulties are greatly increased when several dowels are to be positioned by the same jig in several adjacent tooth impressions. Also, a large number of the relatively expensive jigs must be purchased and maintained by a dental laboratory which makes many models of teeth in the course of a day.

Therefore, it is an object of this invention to provide an inexpensive method and apparatus for quickly and easily positioning a dowel in a negative impression of a tooth.

Another object of this invention is to provide a method and apparatus for positioning and securely retaining a dowel in the center of the impression of a tooth while the impression is filled with die material to form a positive replica of the tooth.

Another object of this invention is to provide an inexpensive dowel assembly which is supported directly by the impression material in which a negative impression of the tooth is formed.

Another object of this invention is to provide an inexpensive dowel assembly which enables dowels to be readily positioned relative to each other and to adjacent negative impressions of teeth while a positive replica of the teeth is formed.

The invention is explained in conjunction with illustrative embodiments shown in the accompanying drawing in which:

FIG. 1 is an enlarged side view of a dowel assembly illustrating a first embodiment of the invention;

FIG. 2 is an enlarged end view, taken along the line 2—2 of FIG. 1, further illustrating the dowel assembly;

FIG. 3 is an enlarged elevational view of a second embodiment of a dowel assembly illustrating the invention;

FIG. 4 is an enlarged end view, taken along the line 4—4 of FIG. 3, further illustrating the dowel assembly of FIG. 3;

FIG. 5 is a plan view of a dental impression tray in which a negative impression of teeth is formed and in which the dowel assemblies of FIGS. 1 and 3 are mounted;

FIG. 6 is a plan view of the dental impression tray of FIG. 5 with die material filling the negative impressions of teeth;

FIG. 7 is a plan view of the mounting tray of FIG. 6 illustrating the positioning of channel forming members on the dowel assembly of FIGS. 1 and 2;

FIG. 8 is an enlarged sectional view, taken along the line 8—8 of FIG. 5, illustrating the mounting of the dowel assembly, shown in FIG. 1, in the negative impression of a tooth;

FIG. 9 is an enlarged sectional view, taken along the line 9—9 of FIG. 5, illustrating the mounting of the dowel assembly, shown in FIG. 3, in the negative impression of a tooth;

FIG. 10 is an enlarged sectional view, taken along the line 10—10 of FIG. 7 illustrating the relationship between a channel forming member, a positive replica of a tooth, and the dowel assembly of FIG. 1;

FIG. 11 is a side view of a model of teeth, illustrating the positioning of dowel assemblies, similar to those of FIGS. 1 and 3, and the use of channel forming members, similar to those illustrated in FIGS. 7 and 10;

FIG. 12 is a side view of the model of FIG. 11 with the channel forming members removed and a selected tooth separated from the other teeth to enable the tooth to be removed from the model;

FIG. 13 is a perspective view of a tooth mounted on a dowel assembly; and

FIG. 14 is a side view of a third embodiment of a dowel assembly illustrating the invention.

Referring now to the drawings in greater detail, a dowel assembly 10 is illustrated in FIG. 1. The dowel assembly 10 is intended for use by dentists and laboratory technicians for retaining a positive replica of a patient's teeth on a base stone. The dowel assembly 10 includes a body or base portion 12 from which a pin or leg section 14 projects. The pin 14 is mounted coaxially with the longitudinal axis 16 of the body 12. The body 12 includes a base section 18 from which a shank 20 extends. The base section 18 and shank 20 are separated by a radially outwardly extending shoulder or collar 22.

As is perhaps best seen in FIG. 2, the base section 18 is formed with a pair of opposite flat parallel key surfaces 24 which extend for substantially the entire longitudinal length of the base section 18. As will be explained in greater detail subsequently, the key surfaces 24 are utilized to orient the dowel assembly 10 in a socket in a base stone. The flat key surfaces 24 mate with similar surfaces in the socket of the base stone so that, when the dowel assembly 10 is removed from the socket, it is always repositioned in the same orientation as when the model was made.

Referring now to FIG. 3, a second embodiment of the dowel assembly is shown. In this embodiment a dowel assembly 26 includes a transverse or radially outwardly extending pin or leg section 28 which is connected to a dowel body 30. As in the embodiments of FIGS. 1 and 2, the body 30 of the dowel assembly 26 includes a base section 32 from which a shank section 34 extends. The shank section 34 is separated from the base section 32 by a shoulder or collar 36. The base and shank are positioned coaxially with a longitudinal axis 40 of the dowel assembly 26.

The pin 28 includes a first relatively straight radially outwardly extending section 42 which is advantageously connected by spot welding to the base section 32. A second radially outwardly and downwardly extending pin section 44 is also attached to the base 32. The pin section 42 is located with a longitudinal axis 46 oriented at right angles to the longitudinal axis 40 of the dowel assembly. The pin section 44 is mounted with a longitudinally extending axis 48 at an acute angle to the longitudinally extending axis 40 of the dowel assembly. As seen in FIG. 4, the pin sections 42 and 44 extend radially outwardly from the base section 32. As will be explained in greater detail subsequently, the downwardly sloping pin section 44 enables the dowel assembly 26 to be readily mounted relative to a negative tooth impression. The pin assembly 26 is also provided with a pair of flat positioning key surfaces 50 to facilitate the locating of the dowel assembly 26 relative to a base stone.

Referring now to FIG. 5, a dental tray 52 is shown in which negative impressions 54 of teeth and the associated gum areas are formed. The negative impressions 54 are formed in a suitable elastomeric impression material 56. The impression material 56 can be any of the commercially available elastomeric materials which are commonly formed of a silicone base rubber, mercaptan base rubber or hydrocolloid.

The dowel assemblies 10 and 26 are mounted adjacent to negative impressions of teeth which have been selected for dental work. After the pin assemblies 10 and 26 have been positioned in the tray 52, the negative impressions 54 are filled with a suitable die material 60, as shown in FIG. 6. The die material 60 can be any of the commercially available calcium sulfate hemihydrate compounds. A pair of wire loops or screw eyes 62 are positioned in the die material 60 to facilitate the attaching of a positive replica of the teeth on a base stone. In FIGS. 7 and 10, channel forming members 64 are placed on an outwardly projecting end portion of the dowel assemblies 10 and 26 to form channels in the base stone to facilitate the removal of a selected tooth from the base stone.

The above well known process of forming a positive replica of a patient's teeth is facilitated by the use of the dowel assemblies 10 and 26. The dowel assembly 10 facilitates the practice of the process by the use of the outwardly extending pin or leg section 14 which is mounted in direct engagement with the impression material 56 in the dental tray 52 (see FIG. 8). The pin 14 pierces an inner surface or wall 68 of a negative impression 54 of a tooth to locate the dowel assembly 10 in a central portion of the negative impression 54. In the example of FIG. 8, the pin or leg 14 engages the incisal area 70 of the crown portion of a tooth. When practicing the present invention it is contemplated that the pin or leg 14 will engage a non-critical area of the impression, that is an area away from margins, slots, or pinhole preparations. It should be noted that the dowel assembly 10 is retained in a spaced apart relationship relative to the critical side walls 72 and 74 of the crown portions of a negative impression of a tooth by the impaling of the pin 14 in the impression material 56.

Referring now to FIG. 9, the dowel assembly 26 is shown mounted in a dental tray 52 with the pin section 42 engaging a labial or front surface 80 of the negative impression 54. The angular pin section 44 engages a lingual or rear surface 82 of the negative impression 54. It should be noted that the pin section 42 engages the front surface 80 of the negative impression 54 at an associated non-vital gum area 86 away from a tooth or crown area 88. In a similar manner, the pin section 44 engages the rear surface 82 of the negative impression 54 at the associated non-vital gum area 86. Of course, the position of the dowel assembly 26 can be reversed so that the pin section 42 engages the rear surface 82 and the pin section 44 engages the front surface 80.

The dowel assembly 26 is mounted in the impression 54 by impaling the pin section 42 in the mounting material 56 and by then impaling the pin section 44 in the impression material 56. The two pin sections 42 and 44 engage the mounting material 56 to retain a dowel assembly 26 in the generally vertical relationship spaced apart from the labial and lingual surfaces 80 and 82 of the negative impression 54. Although the dowel assembly 26 is fabricated by spot welding the pin sections 42 and 44 to the base 32, it is contemplated that the pin sections 42 and 44 could be fabricated as an integral unit and extend through the base 32. If the pin assembly 26 was fabricated in this last mentioned manner, the base 32 would be pivotal to facilitate orientating the base 32 at an angle relative to the pin 28.

As previously indicated, with the dowel assembly 26 the pin sections 42 and 44 extend through the non-vital gum area 86 associated with the negative impression 54. With the dowel assembly 10, the pin 14 extends through the comparatively vital tooth or crown area 88 of the negative impression 54. Therefore, the pin 14 must be carefully trimmed or cut back. However, with the dowel assembly 26, the pin sections 42 and 44 project through a non-vital upper area of the gum impression. Since the die material 60 is usually trimmed back in this area, the outwardly protruding end portions of the pin sections 42 and 44 can be trimmed at the same time the die material is trimmed. It will also be appreciated that the two radially extending pin sections 42 and 44 will securely support the dowel assembly 26 in a predetermined position relative to the negative impression 54.

As is perhaps best seen in FIG. 10, the negative impressions 54 are filled with die material 60, which can be any of the commercially available die materials, such as a "Bingle Die," to a level above the radially outwardly extending shoulder 22 of the dowel assembly 10. The lower end portion of the base section 18 and the shank section 20 are engaged by the die material 60 to prevent the dowel assembly 10 from being displaced vertically from a positive replica 89 of a tooth in the associated gum. The channel forming members 64 are then connected to an upper end portion of the body section 18. A base stone 90 (see FIGS. 11 and 12) is then cast over the positive replica 89 of a tooth. The base stone 90 is formed of plaster of paris, or any other suitable material, and provides a mounting means for the positive replica of a patient's tooth.

As is shown in FIG. 11, the channel forming members 64 project outwardly of the base stone 90. When the channel forming members 64 are pulled outwardly from the base stone 90, a rectangular channel 92, as shown in FIG. 12, is formed. Teeth 94 and 96, which are to be worked on, are separated from the positive replicas of the other teeth in a patient's mouth by saw cuts 98 and 100. The positive replicas 94 and 96 can then be disengaged from the base stone 90 by prying against an end portion of the base 18 or 32 of the dowel assemblies 10 and 26, as indicated at 104 in FIG. 12. The separated positive replica of a tooth 94 is mounted on the associated dowel assembly 10 for ease of handling, as shown in FIG. 13. It should be noted that both a crown portion 106 and an associated gum portion 108 of the tooth replica 94 are separated from the base stone 90.

From an inspection of FIG. 13 it is apparent that the dowel assembly 10 projects centrally through the positive replica 94. Therefore, the positive replica 94 is structurally strengthened by the dowel assembly 10. The dowel assembly 26 does not project through a positive replica of a tooth and does not increase the structural strength of a positive replica of a tooth to the same extent as does the dowel assembly 10. However, it is believed that many laboratory technicians and dentists will prefer the dowel assembly 26, since the pin sections 42 and 44 project through a non-critical surface area of the positive replica.

The dowel assemblies 10 and 26 can advantageously be combined to form a single pin dowel assembly 120 (see FIG. 14). The dowel assembly 120 includes a body 122 from which a shank 124 extends. A longitudinally outwardly extending pin or leg section 126 is connected to the shank 124 in much the same manner as previously described for the dowel assembly 10 of FIG. 1. In addition, a pair of transversely outwardly extending pin sections 128 and 130 are connected to the body 122 of the dowel. The transversely extending pin section 128 has an angular configuration similar to the pin section 44 of the dowel assembly 26. The dowel assembly 120 incorporates many of the advantages of both the dowel assembly 10 and the dowel assembly 26. In addition, by providing both transversely extending pin sections and longitudinally extending pin sections, the dowel assembly 120 can be firmly mounted relative to the negative impression of a tooth in unusual situations which might require such a firm mounting. Also, any of the outwardly extending pin sections 126, 128 and 130 can be clipped off to provide either the dowel assembly 10, the dowel assembly 26, or a variation of these two dowel assemblies.

Method of operation

The manner in which the present invention may be practiced and the purpose to which it may be put are evident from the foregoing description. However, for purposes of affording a more complete understanding of the invention, it is advantageous now to provide a functional description of the mode in which the invention is practiced. When crowns or inlays are to be cast in teeth, a negative impression of the patient's teeth is first formed in a suitable impression material 56 in the dental tray 52. The dowel assemblies 10 and 26 are then mounted in direct engagement with the impression material 56 by impaling the dowel assemblies on outwardly extending pins or legs 14 and 28 in the impression material. The pins or legs 14 and 28 retain the body sections 12 and 30 of the dowel assemblies 10 and 26 in a spaced apart relationship relative to the critical downwardly extending side walls of the negative impressions 54. After the dowel assemblies 10 and 26 have been mounted on the impression material 56, a suitable die material 60 is flowed into the negative impressions to form positive replicas of a patient's teeth and the associated gum area. A base stone 90 is then integrally cast with the positive replica of the patient's teeth and gum area. The teeth which are selected for forming the crowns and the inlays are separated by saw cuts 98 and 100 from the adjacent positive replicas of a patient's teeth. The selected teeth can then be removed on the associated dowel assembly from the base stone 90. The flat parallel positioning key surfaces 24 and 50 facilitate the repositioning of the tooth on the base stone 90. The flat positioning key surfaces 24 and 50 prevent the positive replica of the tooth from rotating and reposition the positive replica of the tooth accurately relative to the base stone 90.

When the dowel assembly 10 is used, the longitudinally extending pin 14 will extend outwardly from the crown portion of the positive replica of a tooth. Thus, the positive replica of the tooth is reinforced by the pin 14. The dowel assembly 26 is formed with radially extending pin sections 42 and 44 which will extend out of a non-critical upper portion of either the crown section or an associated gum section of the positive replica of a tooth. The outwardly projecting pin sections can be readily trimmed away without danger of marring the critical incisal or occlusal surface of the replica of a tooth.

The pin dowel assembly 120 will be mounted in the impression material in much the same manner as are the dowel assemblies 10 and 26. However, the dowel assembly 120 has the additional advantage, in that it will engage the impression material at three points rather than one point as with the dowel assembly 10 or two points as with the dowel assembly 26. This three-point mounting for the dowel assembly 120 will provide an extremely secure anchoring for the dowel assembly. It is contemplated that when the dowel assembly 120 is used, one or more of the pin sections 126, 128 and 130 may not be required and will be snipped or cut off from the body 122 or shank 124 of the dowel. Thus, the dowel assembly 120 will have all of the advantages of the dowel assemblies 10 and 26 plus additional versatility.

Although generally triangular base sections 18, 32 and 122 have been illustrated in the preferred embodiment of the invention, it is contemplated that base sections having an oval, conical, pyramidal or other shape could be utilized. It is also contemplated that the dowel assemblies can be made by many methods such as extruding, casting, or die punching. The dowel bodies can be molded of plastic with integrally formed plastic pins or metal pin inserts.

What is claimed is:

1. A dental apparatus for use in making a positive replica of a tooth from a negative impression of the tooth formed in impression material, said negative impression having front and back tooth-defining walls, comprising an elongated dowel having an elongated body portion and a shank portion, said body portion having at least one flat surface and being tapered along its longitudinal length to provide a wide end and a narrow end, said shank portion extending longitudinally from the wide end of said body portion, an elongated pin on said body portion adjacent said wide end, said pin including a first end portion extending from said body portion generally transversely of the dowel and a second end portion extending from said body portion away from the narrow end thereof at an acute angle with respect to the longitudinal axis of said dowel, said first and second end portions lying generally in the same plane and extending from opposed surfaces of the body portion, whereby said first pin portion may be inserted into one of the impression walls to restrain longitudinal tilting of the dowel in the front-to-back direction with respect to the impression walls and said second pin portion may be inserted into the other impression wall to restrain longitudinal tilting movement in a direction generally transverse to said front-to-back direction, whereby said dowel may be firmly and accurately positioned in said impression material.

2. The apparatus of claim 1 in which said first and second end portions extend generally parallel with respect to said flat surface.

3. A dental apparatus for use in making a positive replica of a tooth from a negative impression of the tooth formed in impression material, said negative impression having front and back tooth-defining walls, comprising an elongated metal dowel having an elongated body portion and a shank portion, said body portion having at least one flat surface and being tapered along its longitudinal length to provide a wide end and a narrow end, said shank portion extending longitudinally from the wide end of said body portion, a metal pin, said pin being angled to provide a first portion and a second portion, the included angle between said pin portions being at least 90°, said first pin portion being secured to said body portion adjacent said wide end to extend generally transversely of said dowel, said second pin portion extending at an acute angle with respect to the longitudinal axis of said dowel, said first and second pin portions lying generally in the same plane and extending from opposed surfaces of the body portion, whereby said first pin portion may be inserted into one of the impression walls to restrain longitudinal tilting of the dowel in the front-to-back direction with respect to the impression walls and said second pin portion may be inserted into the other impression wall to restrain longitudinal tilting movement in a direction generally transverse to said front-to-back direction, whereby said dowel may be firmly and accurately positioned in said impression material.

4. The apparatus of claim 3 in which the plane defined by said angled pin portions is generally parallel to said flat surface.

5. The apparatus of claim 3 in which said dowel is metal, said first pin portion being spot welded to said body portion.

6. The apparatus of claim 4 in which said body portion includes a second flat surface extending generally parallel to said first flat surface.

7. The dental apparatus of claim 6 wherein said body portion is provided with third and fourth flat surfaces, said third and fourth flat surfaces being angularly related to provide said taper, each of said third and fourth flat surfaces extending generally perpendicularly to said first and second flat surfaces to provide said body portion with a generally rectangular transverse cross section.

References Cited
UNITED STATES PATENTS

| | | | |
|---|---|---|---|
| 2,337,036 | 12/1943 | Erdle | 249—54 |
| 2,836,849 | 6/1958 | Humphrey. | |
| 2,842,845 | 7/1958 | Carlson. | |
| 2,851,728 | 9/1958 | Spalten. | |
| 3,226,827 | 1/1966 | Spalten. | |
| 3,255,992 | 6/1966 | Kersten | 18—5.7 X |

ROBERT PESHOCK, *Primary Examiner.*

U.S. Cl. X.R.

32—17; 249—83, 94